(12) United States Patent
Li et al.

(10) Patent No.: US 8,642,701 B2
(45) Date of Patent: Feb. 4, 2014

(54) POLYPROPYLENE AND POLYLACTIC ACID BLENDS OF INJECTION STRETCH BLOW MOLDING APPLICATIONS

(75) Inventors: Fengkui Li, Houston, TX (US); Luyi Sun, Pearland, TX (US); John Ashbaugh, Houston, TX (US); David Rauscher, Angleton, TX (US); Leland Daniels, Houston, TX (US); Robert Dotter, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 214 days.

(21) Appl. No.: 13/022,655

(22) Filed: Feb. 8, 2011

(65) Prior Publication Data

US 2011/0195210 A1    Aug. 11, 2011

Related U.S. Application Data

(63) Continuation-in-part of application No. 12/165,051, filed on Jun. 30, 2008.

(51) Int. Cl.
| | |
|---|---|
| *C08L 51/06* | (2006.01) |
| *C08F 10/06* | (2006.01) |
| *C08F 10/02* | (2006.01) |
| *C08G 63/08* | (2006.01) |

(52) U.S. Cl.
USPC .................. 525/64; 525/31; 525/70; 525/71; 525/78; 525/80; 525/186; 525/240; 525/298; 525/302; 525/303; 525/327.3; 525/177; 525/165; 525/166; 525/185; 524/502; 524/504; 524/505; 264/219; 264/176.1; 264/211; 264/211.12; 264/211.24; 264/328.17

(58) Field of Classification Search
USPC .......... 525/177, 165, 166, 185, 190; 524/502, 524/504, 505
See application file for complete search history.

(56) References Cited

U.S. PATENT DOCUMENTS

| | | | |
|---|---|---|---|
| 2005/0249904 A1* | 11/2005 | Batlaw et al. | 428/35.7 |
| 2007/0187876 A1* | 8/2007 | Cink et al. | 264/510 |
| 2008/0230954 A1 | 9/2008 | Gruber et al. | |
| 2010/0009208 A1* | 1/2010 | Lee | 428/483 |
| 2010/0143624 A1 | 6/2010 | Ishiyama | |
| 2010/0227963 A1 | 9/2010 | Hironaka et al. | |

FOREIGN PATENT DOCUMENTS

| | | | |
|---|---|---|---|
| JP | 2005-307128 | * | 11/2005 |

* cited by examiner

*Primary Examiner* — Robert C Boyle

(57) ABSTRACT

Injection stretch blow molded (ISBM) articles containing a bio-based polymers and methods of forming the same are described herein. The method generally includes providing a propylene-based polymer; contacting the propylene-based polymer with polylactic acid to form a polymeric blend; injection molding the blend into a preform; and stretch-blowing the preform into an article.

18 Claims, 2 Drawing Sheets

US 8,642,701 B2

POLYPROPYLENE AND POLYLACTIC ACID BLENDS OF INJECTION STRETCH BLOW MOLDING APPLICATIONS

CROSS-REFERENCE TO RELATED APPLICATIONS

This application claims the benefit of U.S. Provisional Patent Application Ser. No. 12/165,051, filed Jun. 30, 2008.

FIELD

Embodiments of the present invention generally relate to polymeric blends including a biopolymer adapted for use in injection stretch blow molding. In particular, embodiments of the invention relate to polypropylene and polylactic acid blends adapted for use in injection stretch blow molding.

BACKGROUND

Synthetic polymeric materials, such as polyethylene terephthalate and polypropylene, are widely used in injection stretch blow molding manufacturing of containers, such as bottles and jars, for a variety of commercial end-uses ranging from medical containers to food containers. While articles constructed from synthetic polymeric materials have widespread utility, these materials tend to degrade slowly, if at all, in a natural environment. In response to environmental concerns, interest in the production and utility of more readily biodegradable polymeric materials comprising polylactic acid, a biodegradable polymer, has been increasing. These materials, also known as "green materials", may undergo accelerated degradation in a natural environment. The utility of these biodegradable polymeric materials is often limited by their poor mechanical and/or physical properties.

Attempts have been made to utilize polylactic acid for injection stretch blow molding (ISBM) applications. However, PLA is known to be brittle and exhibit low toughness, which results in unsatisfactorily low impact strength ISBM articles, particularly at cold temperatures. As ISBM articles are good candidates to contain refrigerated food and beverages, cold temperature drop impact strength is a desirable characteristic. Blends of PLA with elastomeric materials or other impact modifying polymers have been proposed, however due to poor processability and/or undesirable mechanical properties (e.g., low top load strength, low bumper compression strength), previous blends have not been used successfully in ISBM applications requiring impact strength and production efficiency. Therefore, a need exists for a biodegradable blend suitable for ISBM production of articles having improved drop impact strength, thus providing an environmentally friendly alternative to synthetic polymeric materials.

SUMMARY

Embodiments of the present invention include an injection stretch blow molded (ISBM) article containing a bio-based polymer thrilled by a process including providing a propylene-based polymer; contacting the propylene-based polymer with polylactic acid to form a polymeric blend; injection molding the blend into a preform; and stretch-blowing the preform into an article.

One or more embodiments include the article of the preceding paragraph, wherein the propylene-based polymer is selected from propylene homopolymer, propylene random copolymer, and propylene impact copolymer.

One or more embodiments include the article of any preceding paragraph, wherein the propylene-based polymer has a concentration in a range from about 65 wt. % to about 95 wt. % based on the weight of the blend.

One or more embodiments include the article of any preceding paragraph, wherein the polylactic acid has a concentration in a range from about 5 wt. % to about 35 wt. % based on the weight of the blend.

One or more embodiments include the article of any preceding paragraph, wherein the contacting step includes contacting the propylene-based polymer with the polylactic acid in the presence of a reactive modifier or a non-reactive modifier to form the polymeric blend.

One or more embodiments include the article of any preceding paragraph, wherein the modifier has a concentration in a range from about 1 wt. % to about 10 wt. % based on the weight of the blend.

One or more embodiments include the article of any preceding paragraph, wherein the modifiers are epoxy-functionalized polyolefins, PP-g-nylon, ethylene-methacrylate copolymer, SEBS, maleated SEBS, and maleated polyolefins.

One or more embodiments include the article of any preceding paragraph, wherein the propylene-based polymer exhibits a melt flow rate of from about 1 dg/min, to about 50 dg/min.

One or more embodiments include the article of any preceding paragraph, wherein the article exhibits a maximum top load of at least about 150 N at a weight of 23 g.

One or more embodiments include the article of any preceding paragraph, wherein the article exhibits a maximum bumper compression of at least about 100 N at a weight of 23 g.

One or more embodiments include the article of any preceding paragraph, wherein the article exhibits a maximum top load of at least about 150 N at a weight of 23 g.

One or more embodiments include the article of any preceding paragraph, wherein the article exhibits a maximum bumper compression of at least about 115 N at a weight of 23 g.

One or more embodiments include the article of any preceding paragraph, wherein the article is semi-opaque or opaque.

One or more embodiments include the article of any preceding paragraph, wherein the article is a beverage container.

One or more embodiments include the article of any preceding paragraph, wherein the article is a dairy container.

One or more embodiments include the article of any preceding paragraph, wherein the article has a haze greater than about 50%.

One or more embodiments include the article or any preceding paragraph, wherein the article has a gloss 45° less than about 50.

One or more embodiments include a method of forming a injection stretch blow molded (ISBM) article containing a bio-based polymer including providing a propylene-based polymer; contacting the propylene-based polymer with polylactic acid to form a polymeric blend; injection molding the blend into a preform and stretch-blowing the preform into an article.

One or more embodiments include the method of the preceding paragraph, wherein the article is stretch-blown at a production rate of at least about 1000 articles per hour.

One or more embodiments include the method of any preceding paragraph, wherein the article is stretch-blown at a production rate of at least about 3000 articles per hour.

DETAILED DESCRIPTION

Introduction and Definitions

Figure 1:
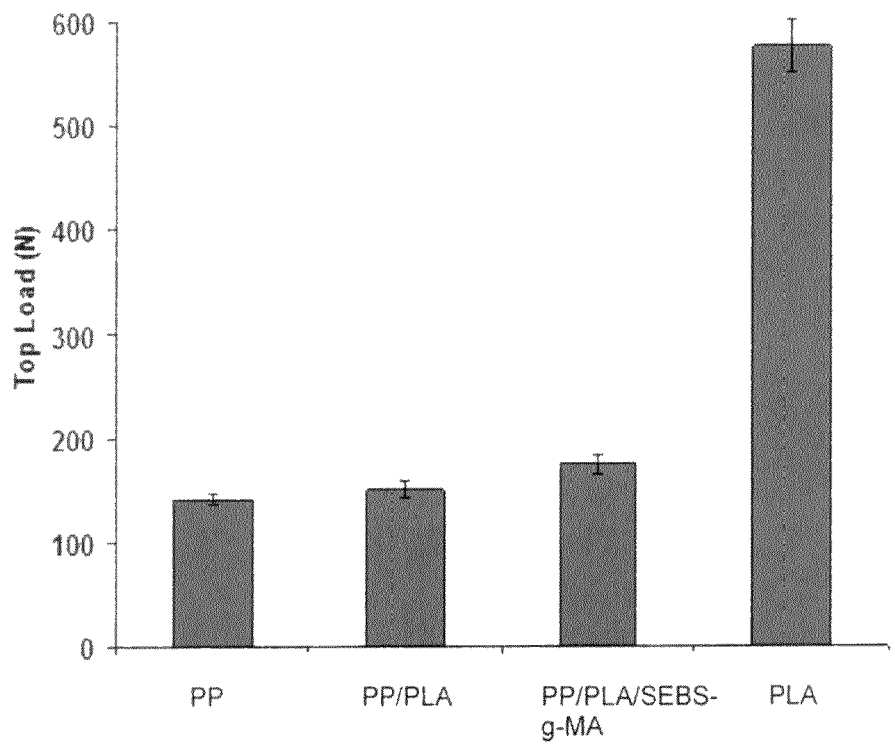
FIG. 1 illustrates the maximum top load strength of ISBM bottles formed from various polymer samples in Example 1

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Various ranges are further recited below. It should be recognized that unless stated otherwise, it is intended that the endpoints are to be interchangeable. Further, any point within that range is contemplated as being disclosed herein.

As used herein, "cold temperature" refers to a range of temperatures typical of standard refrigeration methods and means that a temperature difference of a few degrees does not matter to the phenomenon under investigation, such as drop impact testing. In some environments, cold temperature may include a temperature of from about 32° F. to about 50° F. (0° C. to 10° C.) For purposes of cold temperature drop impact testing, as discussed herein, it is customary in the industry to test at a temperature of about 40° F. (about 4.5° C.). However, cold temperature measurements generally do not include close monitoring of the temperature of the process and therefore such a recitation does not intend to hind the embodiments described herein to any predetermined temperature range.

As used herein, "opaque" means an article is impenetrable to visible light, that is, an opaque object prevents transmission of essentially all visible light. "Transparent" means essentially all visible light passes through the article. The term "semi-opaque" means some, but not all, visible light passes through the article.

Polymeric compositions and methods of making and using the same are described herein. The polymeric compositions comprise polylactic acid, also called polylactide, biodegradable thermoplastic polymer derived from renewable resources, such as corn starch and sugarcanes. In one or more embodiments, polymeric compositions comprise a blend of olefin-based polymer (i.e., polyolefin) and polylactic acid. In one or more embodiments, polymeric compositions comprise a blend of polyolefin, polylactic acid, and a reactive modifier (i.e. reactive compatibilizer).

The polymeric compositions are generally materials capable of at least partial breakdown. For example, the polymeric compositions may be broken down by the action of things.

Catalyst Systems

The polyolefins may be formed using any suitable catalyst system useful for polymerizing olefin monomers. Catalyst systems useful for polymerizing olefin monomers include any catalyst system known to one skilled in the art. For example, the catalyst system may include metallocene catalyst systems, single site catalyst systems, Ziegler-Natta catalyst systems or combinations thereof, for example. As is known in the art, the catalysts may be activated for subsequent polymerization and may or may not be associated with a support material. A brief discussion of such catalyst systems is included below, but is in no way intended to limit the scope of the invention to such catalysts.

For example, Ziegler-Natta catalyst systems are generally formed from the combination of a metal component (e.g. a catalyst) with one or more additional components, such as a catalyst support, a cocatalyst and/or one or more electron donors, for example.

Metallocene catalysts may be characterized generally as coordination compounds incorporating one or more cyclopentadienyl (Cp) groups (which may be substituted or unsubstituted, each substitution being the same or different) coordinated with a transition metal through π bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

Polymerization Processes

As indicated elsewhere herein, catalyst systems are used to form polyolefin compositions. Once the catalyst system is prepared, as described above and/or as known to one skilled in the art, a variety of processes may be carried out using that catalyst to form polyolefins. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See. U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735 and U.S. Pat. No. 6,147,173, which are incorporated by reference herein.)

In certain embodiments, the processes described above generally include polymerizing one or more olefin monomers to form polyolefins. The olefin monomers may include $C_2$ to $C_{30}$ olefin monomers, or $C_2$ to $C_{12}$ olefin monomers (e.g. ethylene, propylene, butene, enteric, methylpentene, hexene, octene and decent), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. Nos. 4,271,060, 5,001,205, 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary front about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. Nos. 4,543,399; 4,588,790; 5,028,670; 5,317,036; 3,352,749; 5,405,922; 5,436,304; 5,456,471; 5,462,999; 5,616,661; 5,627,242; 5,665,818; 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which cart itself be filled with circulating slurry of growing polymer particles in a diluent, for example. Optionally, hydrogen (or other chain terminating agents, for example) may be added to the process, such as for molecular weight control of the resultant polymer. The loop reactor may be maintained at a pressure of from about 27 bar to about 50 bar or from about 35 bar to about 45 bar and a temperature of from about 3° C. to about 121° C., for example. Reaction heat may be removed through the loop wall via any method known to one skilled in the art, such as via a double-jacketed pipe or heat exchanger, for example.

Alternatively, other types of polymerization processes may be used, such as stirred reactors in series, parallel or combinations thereof, for example. Upon removal from the reactor, the polyolefin may be passed to a polymer recovery system for further processing, such as addition of additives and/or extrusion, for example.

Polymer Product

The polymeric composition includes one or more polyolefins. The polyolefin (and blends thereof) formed via the processes described herein may include, but are not limited to, linear low density polyethylene, elastomer, plastomer, high density polyethylene, low density polyethylene, medium density polyethylene, polypropylene, and polypropylene copolymer, for example.

Unless otherwise designated herein, all testing methods are the current methods at the time of filing.

In one or more embodiments, the polyolefin includes propylene-based polymer. As used herein, the term "propylene-based" is used interchangeably with the terms "propylene polymer" or "polypropylene" and refers to a polymer having at least about 50 wt. %, or at least about 70 wt. %, or at least about 75 wt. %, or at least about 80 wt. %, or at least about 85 wt. % or at least about 90 wt. % polypropylene relative to the total weight of polymer, for example.

In one or more embodiments, the propylene-based polymer may have a molecular weight distribution ($M_n/M_w$) of from about 1.0 to about 20, or from about 1.5 to about 15 or from about 2 to about 12, for example.

In one or more embodiments, the propylene-based polymer may have a melting point ($T_m$) (as measured by differential scanning calorimetry) of at least about 140° C., or from about 140° C. to about 170° C., or from about 145° C. to about 170° C., for example.

In one or more embodiments, the propylene-based polymer may have a melt flow rate (MFR) (as determined in accordance with ASTM D-1238 condition "L") of at least about 1 dg/min., or from about 2 dg/min. to about 50 dg/min., or from about 5 dg/min. to about 30 dg/min., for example.

In one or more embodiments, the propylene-based polymer is formed from a metallocene catalyst.

In one or more embodiments, the propylene-based polymer includes polypropylene homopolymers. Unless otherwise sped lied, the term "polypropylene homopolymer" refers to propylene homopolymers. i.e., polypropylene, or those polyolefins composed primarily of propylene and amounts of other comonomers, wherein the amount of comonomer is insufficient to change the crystalline nature of the propylene polymer significantly.

In one or more embodiments, the propylene-based polymer includes polypropylene-based random copolymers. Unless otherwise specified, the term "propylene-based random copolymer" refers to those copolymers composed primarily of propylene and an amount of at least one comonomer, wherein the polymer includes at least about 0.1 wt. %, or at least about 0.8 wt. %, or at least about 2 wt. %, or from about 0.5 wt. % to about 5.0 wt. % comonomer relative to the total weight of polymer, for example. The comonomers may be selected from $c_2$ to $c_{10}$ alkenes. For example, the comonomers may be selected from ethylene, propylene, 1-butene, 1-pentene, 1-hexene, 1-heptene, 1-octene, 1-nonene, 1-decene, 4-methyl-1-pentene, and combinations thereof. In one specific embodiment, the comonomer includes ethylene. Further, the term "random copolymer" refers to a copolymer formed of macromolecules in which the probability of finding a given monomeric unit at any given site in the chain is independent of the nature of the adjacent units.

In one or more embodiments, the propylene-based polymer includes polypropylene impact copolymers. Unless otherwise specified, the term "polypropylene impact copolymer" refers to a semi-crystalline polypropylene or polypropylene copolymer matrix containing a heterophasic copolymer. The heterophasic copolymer includes ethylene and higher alpha-olefin polymer such as amorphous-ethylene-propylene copolymer, for example.

The polymeric composition may include at least 30 wt. %, or from about 31 wt. % to about 99 wt. %, or from about 65 wt. % to about 95 wt. %, or from about 80 wt. % to about 90 wt. % polyolefin based on the total weight of the polymeric composition, for example.

One or more of the polyolefins are contacted with polylactic acid (PLA) or some other polyester to form the polymeric compositions (which may also be referred to herein as a biodegradable blend or blended material). Such contact may occur by a variety of methods. For example, such contact may include blending of the olefin based polymer and the polylactic acid under conditions suitable for the formation of a blended material. Such blending May include dry blending, melt blending, melt compounding, or combinations thereof, by known blending techniques such as mixing and extrusion (e.g., twin-screw extrusion), for example.

The polymeric composition further includes polylactic acid or other polyester. The polylactic acid may include any polylactic acid capable of blending with an olefin based polymer. For example, the polylactic acid may be selected from poly-L-lactide poly-D-lactide (PDLA), poly-LD-lactide (PDLLA) and combinations thereof. The polylactic acid may be formed by known methods, such as dehydration condensation of lactic acid (see, U.S. Pat. No. 5,310,865, which is incorporated by reference herein) or synthesis of a cyclic lactide from lactic acid followed by ring opening polymerization of the cyclic lactide (see, U.S. Pat. No. 2,758,987, which is incorporated by reference herein), for example. Such processes may utilize catalysts for polylactic acid formation, such as tin compounds (e.g., tin octylate), titanium compounds (e.g., tetraisopropyl titanate), zirconium compounds (e.g., zirconium isopropoxide), antimony compounds (e.g., antimony trioxide) or combinations thereof, for example.

In one or more embodiments, the polylactic acid may have a density of from about 1.228 g/cc to about 1.255 g/cc, or from about 1.23 g/cc to about 1.25 g/cc or from about 1.235 g/cc to about 1.245 glee (as determined in accordance with ASTM D1505).

In one or more embodiments, the polylactic acid may exhibit a crystalline melt temperature ($T_m$) of from about 140° C. to about 190° C., or from about 145° C. to about 185° C. or from about 150° C. to about 180° C. (as determined in accordance with ASTM D3418).

In one or more embodiments, the polylactic acid may exhibit a glass transition temperature of from about 45° C. to about 85° C., or from about 50° C. to about 80° C. or from about 50° C. to about 70° C. (as determined in accordance with ASTM D3417).

The polymeric composition may include from about 0.1 wt. % to about 49 wt. %, or from about 1 wt. % to about 35 wt. %, or from about 5 wt. % to about 35 wt. %, or from about 5 wt. % to about 20 wt. % polylactic acid based on the total weight of the polymeric composition, for example.

In one or more embodiments, the polymeric composition further includes a reactive modifier or a non-reactive modifier. As used herein, the term "reactive modifier" refers to polymeric additives that, when directly added to a molten blend of immiscible polymers (e.g., the polyolefin and the PLA), may chemically react with one or both of the blend components to increase adhesion and stabilize the blend. As used herein, the term "non-reactive modifier" refers to polymeric additives that, when directly added to a molten blend of immiscible polymers (e.g. the polyolefin and the PLA), may not chemically react with one or both of the blend components during typically short residence time, but their different portions of the chains may have solubility parameters similar to respective blend components, and thus increasing adhesion and stabilize the blend. The reactive modifier or non-reactive modifier may be incorporated into the polymeric composition via a variety of methods. For example, during melt blending the polyolefin and the polylactic acid may be contacted with one another in the presence of the reactive modifier or non-reactive modifier.

The reactive modifier may include functional polymers capable of compatibilizing a blend of polyolefin and polylactic acid (PO/PLA blend). Suitable reactive modifiers include epoxy-functionalized polyolefins, or possibly maleic anhydride modified polyolefins, etc. Suitable non-reactive modifiers include nylon-grafted polyolefins, ethylene-methacrylate copolymers, styrene-ethylene-butadiene-styrene (SEBS) polymers, and combinations thereof, for example.

In one or more embodiments, the reactive functional polymer is a graftable polyolefin selected from polypropylene, polyethylene, homopolymers thereof, copolymers thereof, and combinations thereof.

In one or more embodiments, the reactive modifier comprises an epoxy-functionalized polyolefin. Examples of epoxy-functionalized polyolefins suitable for use in this disclosure include without limitation epoxy-functionalized polypropylene such as glycidyl methacrylate grafted polypropylene (PP-g-GMA), epoxy-functionalized, polyethylene such as polyethylene co-glycidyl methacrylate (PE-co-GMA), and combinations thereof. An example of an epoxy-functionalized polyethylene suitable for use in this disclosure includes LOTADER® GMA products (e.g., LOTADER® AX8840, which is a random copolymer of ethylene and glycidyl methacrylate (PE-co-GMA) containing 8% GMA, or LOTADER® AX8900 which is a random terpolymer of ethylene, methyl acrylate and glycidyl methacrylate containing 8% GMA) that are commercially available from Arkema.

The reactive modifiers may be prepared by any suitable method. For example, the reactive modifiers PP-g-GMA may be formed by a grafting reaction. The reactive modifiers are formed by grafting in the presence of an initiator, such as peroxide. Examples of initiators may include LUPERSOL® 101 and TRIGANOX® 301, commercially available from Arkema, Inc. The grafting reaction may occur in a molten state inside of an extruder, for example (e.g., "reactive extrusion").

In another embodiment, the reactive modifier comprises PP-g-GMA. PP-g-GMA may be prepared by any suitable method such as for example by grafting GMA onto polypropylene in the presence of an initiator such as peroxide. The grafting reaction of GMA onto PP may be conducted in a molten state inside an extruder such as for example a single screw extruder or a twin-screw extruder. For example, a feedstock comprising PP, GMA, and initiator (i.e., peroxide) may be fed into an extruder reactor sequentially along the extruder, alternatively the feedstock (i.e. PP, GMA, and initiator) may be pre-mixed outside and fed into the extruder. In an embodiment, the initiator may be used in an amount of from 0.03 wt. % to 2 wt. %, or from 0.2 wt. % to 0.8 wt. %, or from 0.3 wt. % to 0.5 wt. % based on the total weight of the compatibilized polymeric blend.

In an alternate embodiment, the reactive modifier PP-g-GMA may be prepared using a multi-functional acrylate comonomer in order to provide the resulting PP-g-GMA reactive modifier with a higher grafting yield, as compared to the grafting yields obtainable (i.e., less than 1 wt. %) by employing conventional grafting methods. Incorporation of the multi-functional acrylate comonomer boosts the grafting reaction to obtain a highly grafted GMA having a grafting, yield in a range from 1 wt. % to 15 wt. %, or at least 1.5 wt. %, or in a range from about 2 wt. % to about 3 wt. %.

The highly grafted PP-g-GMA is prepared by grafting GMA onto polypropylene in the presence of an initiator and a multi-functional acrylate comonomer. The multi-functional acrylate comonomers may comprise polyethylene glycol diacrylate, alkoxylated hexanediol diacrylate, trimethylolpropane triacrylate (TMPTA), or combinations thereof. Examples of multi-functional acrylate comonomers suitable for use in this disclosure include without limitation SR256 (polyethylene glycol diacrylate). CD560 (alkoxylated hexanediol diacrylate). SR351 (TMPTA). SR9003 (propoxylated neopentyl glycol diacrylate), SR454 (ethoxylated trimethylolpropane triacrylate), SR230 (diethylene glycol diacrylate), SR368D (tris(2-hydroxy ethyl)isocyanurate triacrylate), etc. which are commercially available from Sartomer.

The grafting reaction of GMA onto polypropylene in the presence of a peroxide and the multi-functional acrylate comonomer polyethylene glycol diacrylate is depicted in Scheme 1.

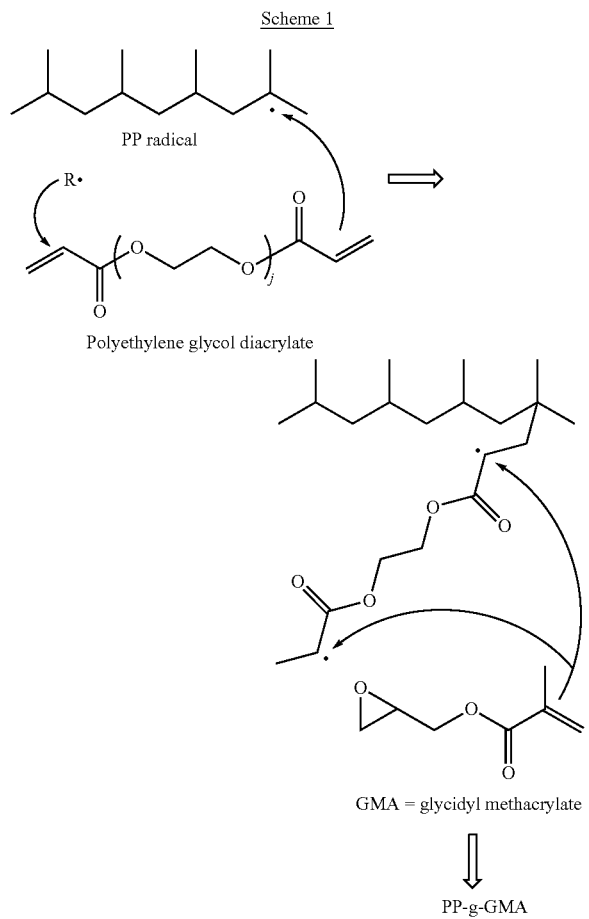

Without wishing to be limited by theory, the hydrogens on the tertiary carbon of polypropylene molecules can be easily abstracted in the presence of peroxide during reactive extrusion, forming polypropylene macroradicals with unpaired electrons. The polypropylene macroradicals which are generally unstable, tend to form free radicals through a step referred to as "β-scission." β-scission refers to a family of reactions wherein bonds that are in a beta-position to a radical are cleaved resulting in the formation of a double bond and a new radical. The β-scission reaction is believed to be responsible mainly for the formation of internal double bonds thus its occurrence is correlated with the allylic content of the final polymer. β-scission is typically favored over the grafting reaction (i.e. the addition of the GMA) resulting in both a lower grafting of GMA and a polypropylene having a lower average molecular weight. However, in the reactions comprising a multi-functional acrylate comonomer, the multi-functional acrylate comonomer may function to readily capture the polypropylene micro-radicals resulting in the formation of a more stable intermediate (i.e. polypropylene-acrylate radicals). The relatively stable propylene-acrylate radicals tend to react more readily with GMA, which is an acrylate type monomer, and consequently favor the grafting reaction.

Furthermore, as shown in Scheme 1, multiple free radicals may exist on the grafted propylene-acrylate molecules thus making it easier to capture and initiate the reaction of GMA. The reactivity of GMA towards acrylate free radicals may be higher than towards polypropylene tertiary macro-radicals. Consequently. PP-g-GMA prepared using a reaction mixture comprising a multi-functional acrylate comonomer may display a higher degree of grafting than a PP-g-GMA prepared using an otherwise similar composition in the absence of a multi-functional acrylate comonomer.

In one or more embodiments, the reactive modifier comprises maleic anhydride modified polyolefin. Examples of maleic anhydride-functionalized polyolefins suitable for use in this disclosure include without limitation maleic anhydride grafted polypropylene (PP-g-MA), maleic anhydride grafted polyethylene (PE-g-MA), and combinations thereof. An example of maleic anhydride grafted polypropylene suitable for use in this disclosure includes commercially available POLYBOND® 3200, containing 1.0 wt. % maleic anhydride, from Chemtura. Another example of a suitable reactive modifier is maleic anhydride grafted styrene-ethylene-butylene-styrene (SIBS-g-MA), product EG1901X, a linear triblock copolymer commercially available from Kraton Polymers, Inc., for example.

In one or more embodiments, the non-reactive modifiers comprise ethylene-methacrylate copolymers, styrene-ethylene-butadiene-styrene (SEBS) polymers. Examples of ethylene-methacrylate copolymers suitable for use in this disclosure include without limitation Eastman's EMAC-SP 1305, EMAC-SP 1307, EMAC-SP 2205, EMAC-SP 2207, Dupont's Entira Strong 1002. Entira Strong 1008, and combinations thereof. An example of styrene-ethylene-butadiene-styrene (SIBS) polymers is the product Kraton G 1643M, a triblock copolymer commercially available from Kraton™ Performance Polymers, Inc., for example.

In another embodiment, the non-reactive modifier comprises PP-g-Nylon. PP-g-Nylon may be prepared by any suitable method such as for example by grafting maleic anhydride onto polypropylene in the presence of an initiator such as peroxide followed by reactive extrusion with nylon 6. The reactions may be conducted in a molten state inside an extruder such as for example a single screw extruder or a twin-screw extruder.

In one or more embodiments, the reactive modifier or non-reactive modifier may include from about 80 wt. % to about 99.5 wt. %, or from about 90 wt. % to about 99 wt. % or from about 95 wt. % to about 99 wt. % polyolefin based on the total weight of the reactive or non-reactive modifier, for example.

In one or more embodiments, the reactive modifier may include from about 0.5 wt. % to about 20 wt. %, or from about 1 wt. % to about 10 wt. % or from about 1 wt. % to about 5 wt.

% grafting component (i.e. the epoxy functional group (e.g. GMA) based on the total weight of the reactive modifier, for example.

The polymeric composition may include from about 0.1 wt. % to about 20 wt. %, or from about 0.5 wt. % to about 10 wt. %, or from about 1 wt. % to about 5 wt. % or from about 2 wt. % to about 5 wt. % reactive or non-reactive modifier based on the total weight of the polymeric composition, for example.

In one or more embodiments, the polymeric composition may be prepared by contacting the polyolefin (PO), PLA or other polyester, and reactive modifier or non-reactive modifier under conditions suitable for the formation of a polymeric blend. The blend may be compatibilized by reactive extrusion compounding of the PO, PLA, and reactive or non-reactive modifier. For example, polypropylene, PLA, and a reactive modifier (e.g. PP-g-GMA) may be dry blended, fed into an extruder, and melted inside the extruder. The mixing may be carried out using a continuous mixer such as a mixer having an intermeshing co-rotating twin screw extruder for mixing and melting the components.

In an embodiment, the polymeric composition comprising the polyolefin, the polylactic acid, the reactive modifier, and/or combinations thereof may also contain additives to impart desired physical properties, such as printability, increased gloss, or a reduced blocking tendency. Examples of additives may include without limitation, stabilizers, ultra-violet screening agents, oxidants, anti-oxidants, anti-static agents, ultraviolet light absorbents, fire retardants, processing oils, mold release agents, coloring agents, pigments/dyes, fillers or combinations thereof, for example. These additives may be included in amounts effective to impart the desired properties.

Product Application

The polymeric compositions and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-rood contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheet, thermoformed sheet, geomembranes and pond liners, for example. Molded articles include single and multi-layered constructions in the form of bottles, tanks, large hollow articles, rigid food containers and toys, for example.

In one or more embodiments, the polymeric compositions are utilized in injection stretch blow molding (ISBM) processes to form ISBM articles. The ISBM articles may include thin-walled bottles and other types of containers, for example. The ISBM articles may be formed by any suitable process. For example. ISBM processes may include injection molding the polymer into a preform and subsequently stretch-blowing the preform into the desired final form, for example.

In one example, polypropylene (PP), PEA, and optionally a reactive or non-reactive modifier may be dry blended, fed into an extruder, and melted inside the extruder. The mixing may be carried out using a mixer having an intermeshing co-rotating twin screw extruder for mixing and melting the components into a biodegradable polymeric blend. The molten biodegradable polymeric blend may be fed to a manifold where it is injected through nozzles into mold cavities. In each mold cavity, the molten blend fills a hollow space surrounding a core rod, thereby forming a preform around the core rod. The preform may be positioned in a reheat stretch blow molding machine where the preforms are heated to a temperature typically in excess of the glass transition temperature (Tg) of the blend. The core rod allows pressurized air into the preform so as to stretch the preform until the preform takes the desired container shape of a container mold surrounding the preform, thereby stretch-blowing the perform into an article. As is known to one skilled in the art, injection stretch blow molding may be accomplished in one or two-stage processes.

In one or inure embodiments, the polymeric compositions, as described, above, are utilized to form the ISBM articles.

In one or more embodiments, the ISBM articles may exhibit a maximum top load strength of at least about 150 N, or at least about 160 N or at least about 170 N, for example.

In one or more embodiments, the ISBM articles may exhibit a bumper compression strength of at least about 95 N, or at least about 100 N or at least about 115 N, for example.

In one or more embodiments, the ISBM articles are refrigerated articles. In one or more embodiments, the refrigerated articles include refrigerated beverage containers. Dairy products and juices are typical of refrigerated beverages which can be stored, transported and sold in the refrigerated articles, for example.

Refrigerated articles formed from the polymeric compositions exhibit improved toughness and improved cold temperature impact strength, important properties for refrigerated articles.

In one or more embodiments, the ISBM articles may exhibit a gloss 45° of less than about 60, or less than about 50 or less than about 40, for example.

In one or more embodiments, the ISBM articles are opaque or semi-opaque. For example, the ISBM articles may exhibit a haze of at least about 40%, or at least about 50% or at least about 60% (as measured by a haze meter).

Many products contained within ISBM articles are light sensitive (e.g., visible or ultraviolet light can be absorbed by the product, potentially resulting in product degradation). Light sensitivity is particularly important for refrigerated products, which can lose nutritional value and gain undesirable flavors upon exposure to light. However, the ISBM opacity (or semi-opacity) of the ISBM articles described herein minimizes product degradation as a result of exposure to light.

In one or more embodiments, the ISBM articles May formed at production rates of 2000 bottles/h and 3000 bottles/h, for example.

The end-use ISBM articles formed from the biodegradable blends of the present invention at production rates of 2000 bottles/h and 3000 bottles/h may advantageously provide improved maximum top load strength and improved bumper compression strength, as compared to ISBM articles formed from neat PP, while also advantageously providing a biodegradable alternative to conventional synthetic polymeric materials.

EXAMPLES

Example 1

To evaluate the processability and bottle properties of the polymeric compositions, polymer samples were injection stretch blow molded (ISBM) into bottles. For comparison purposes, the first sample is a polypropylene-based random copolymer commercially available as neat Total Petrochemicals 7525MZ ("7525MZ, PP"), referred to herein as the PP reference sample. The second sample is a blend of neat 7525MZ PP and a polylactic acid polymer commercially available as NatureWorks® PLA Polymer 4042D ("4042D PLA"), referred to herein as PP/PLA blend, wherein the PP is present in a concentration of about 90 wt. % and the PLA has a concentration of about 10 wt. % based on the total weight of the blend. The third sample is a blend of neat 7525MZ PP, 4042D PLA and the modifier maleic anhydride grafted styrene-ethylene-butadiene-styrene (SEMS-g-MA) commercially available as Kraton™ FG1190X Polymer ("SEBS-g-MA"), referred to herein as PP/PLA/SEBS-g-MA blend, wherein the PP is present in a concentration of about 87 wt %, the PLA has a concentration of about 10 wt. %, and the modifier SEBS-g-MA has a concentration of about 3 wt. % based on the total weight of the blend. Also for comparison purposes, the fourth sample is 4042D PLA, referred to herein as the PLA reference sample.

The polymer samples were injection stretch blow molded (ISBM) into bottles. The samples were formed into 23 g preforms using a Netstal injection molder with the second generation 23 g preform mold. The preforms were conditioned at room temperature for at least 24 hours. After temperature profile optimization, the preforms were successfully stretch blow molded into bottles using an ADS G62 linear injection stretch blow molder at production rates of 2000 bottles/Ir and 3000 bottles/h.

The bottles were subsequently tested for top load strength, bumper compression strength, drop impact strength, haze and gloss.

FIG. 1 is a plot of maximum top load strength for the samples. The plot shows that ISBM bottles formed from the blends of PP/PLA and PP/PLA/SEBS-g-MA demonstrated improved top load strengths of 151 N and 174 N, respectively, as compared to the PP reference sample which exhibited a top load strength of 142 N. Thus, as compared to the top load strength of the PP reference bottles, the bottles formed from the PP/PLA blend improve the top load, strength by about 6%, while bottles formed from the PP/PLA/SEBS-g-MA blend improve the top load strength by about 22%. A comparison of the biodegradable blends (samples 2 and 3) shows that the addition of the reactive modifier SEBS-g-MA in the biodegradable blend (sample 3) further increases the top load strength by about 15%, as compared to PP/PLA blend (sample 2). This result may be due to the reactive modifier imparting better mixing and improved adhesion between the PP and P LA components of the blend.

Figure 2:
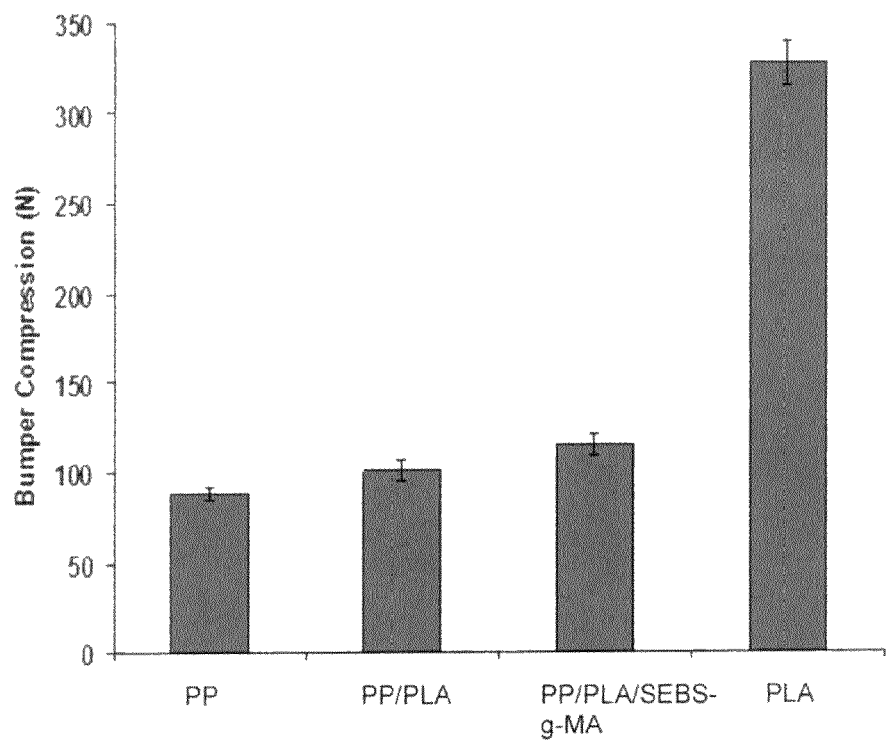
FIG. 2 illustrates the bumper compression strength of ISBM bottles formed from various polymer samples in Example 1.

FIG. 2 is a plot of bumper compression strengths at ½ inch deflection for the samples. The plot shows that ISBM bottles formed from the biodegradable blends of PP/PLA and PP/PLA/SEBS-g-MA demonstrated improved bumper compression strengths of 102 N and 116 N, respectively, as compared to the PP reference sample which exhibited a bumper compression strength of 90 N. Thus, as compared to the bumper compression strength of the PP reference bottles, the bottles formed from the PP/PLA blend improve the bumper compression strength by about 13%, while bottles formed from the PP/PLA/SEBS-g-MA blend improve the bumper compression strength by about 29° A. A comparison of the biodegradable blends (samples 2 and 3) shows that the addition of the reactive modifier SEBS-g-MA in the biodegradable blend (sample 3) further increases the bumper compression strength by about 14%, as compared to PP/PLA blend (sample 2).

The produced ISBM bottles were also tested for cold temperature drop impact strength. Tests of the drop impact strength were conducted at a cold temperature of 40° F. from a height of 4 ft. The bottles were previously stored at 40° F. for at least 12 hours just prior to testing. The tests were carried out by dropping a set of twelve tilled and capped bottles vertically onto the bottle base and horizontally onto the bottle side. A material is considered to have passed the cold temperature drop impact strength test if all twelve articles in the set were still intact after, initial impact and there was zero failure. The bottles produced from the PP reference sample passed the drop impact strength test, whereas the bottles produced from the biodegradable blends (samples 2 and 3) and the PLA reference samples did not. In particular, the biodegradable blends PP/PLA and PP/PLA/SEBS-g-MA performed very similarly in terms of cold temperature drop impact testing, where they averaged a failure rate of one bottle failure per twelve bottles tested from a vertical dropping configuration and three bottles failure per twelve bottles tested from a horizontal dropping configuration. Although the biodegradable blends failed the cold temperature drop impact strength testing, the biodegradable blends demonstrated an improved toughness much better than expected due to the incorporation of PLA as a component of these blends when PLA is known to be an inherently brittle and relatively low toughness material.

The gloss 45° and haze of the produced ISBM bottles were measured and the measurements tabulated in Table 1. The bottles formed from the biodegradable blends of samples 2 and 3 have relatively low gloss and a high degree of haze, as compared to both the PP and PLA reference samples. As a result the biodegradable blends PP/PLA and PP/PLA/SEBS-g-MA exhibit low clarity due to a high degree of haze, or semi-opacity. While this may represent a disadvantage in applications where high clarity, or transparency, is desired, many products store better if protected from light.

TABLE 1

| | Samples | | | |
|---|---|---|---|---|
| | 1<br>7525MZ PP | 2<br>7525MZ PP/<br>4042D PLA | 3<br>7525 PP/<br>4042D PLA/<br>SEBS-g-MA | 4<br>4042D PLA |
| Gloss, 45° | 87.9 ± 2.2 | 31.2 ± 1.4 | 37.2 ± 2.0 | 74.8 ± 2.4 |
| Haze (%) | 1.6 ± 0.1 | 63.1 ± 3.0 | 66.3 ± 1.5 | 4.9 ± 0.1 |

Example 2

To evaluate the processability and bottle properties of the impact copolymer-based compositions, polymer samples were injection stretch blow molded (ISBM) into bottles. For comparison purposes, the fifth sample is a polypropylene impact copolymer commercially available as neat Total Petrochemicals 4820WZ ("4820WZ. PP"). The sixth sample is a blend of neat 4820WZ PP and a polylactic acid polymer commercially available as NatureWorks® PLA Polymer 3001D ("3001D PLA"), wherein the 4820WZ PP is present in a concentration of about 95 wt. % and the PLA has a concentration of about 5 wt. % based on the total weight of the blend. The seventh sample is a blend of neat 4820WZ PP, 3001D PLA and 2% modifier PP-g-nylon6 produced by reactive extrusion of maleated PP and nylon 6. The eighth sample is a blend of neat 4820WZ PP, 3001D PLA and 2% modifier PP-g-GMA produced by reactive extrusion of maleated PP, GMA, multifunctional monomers and peroxide. The ninth sample is a blend of neat 4820WZ PP. 3001D PLA and the modifier Lotader AX8840 commercially available at Arkema Inc. The tenth sample is a blend of neat 4820WZ PP, 3001D PLA and the modifier polybond 3150 commercially available at Chemtura. The eleventh sample is a blend of neat 4820WZ PP. 3001D PLA and the modifier EMAC 1307 commercially available at Eastman. The twelfth sample is a blend of neat 4820WZ PP, 3001D PEA and the modifier Kraton 1643M commercially available at Kraton Inc.

The polymer samples were injection stretch blow molded (ISBM) into bottles the same way as in Example 1. The bottles were subsequently tested for top load strength, wall weight distribution, and drop impact strength.

Figure 3:
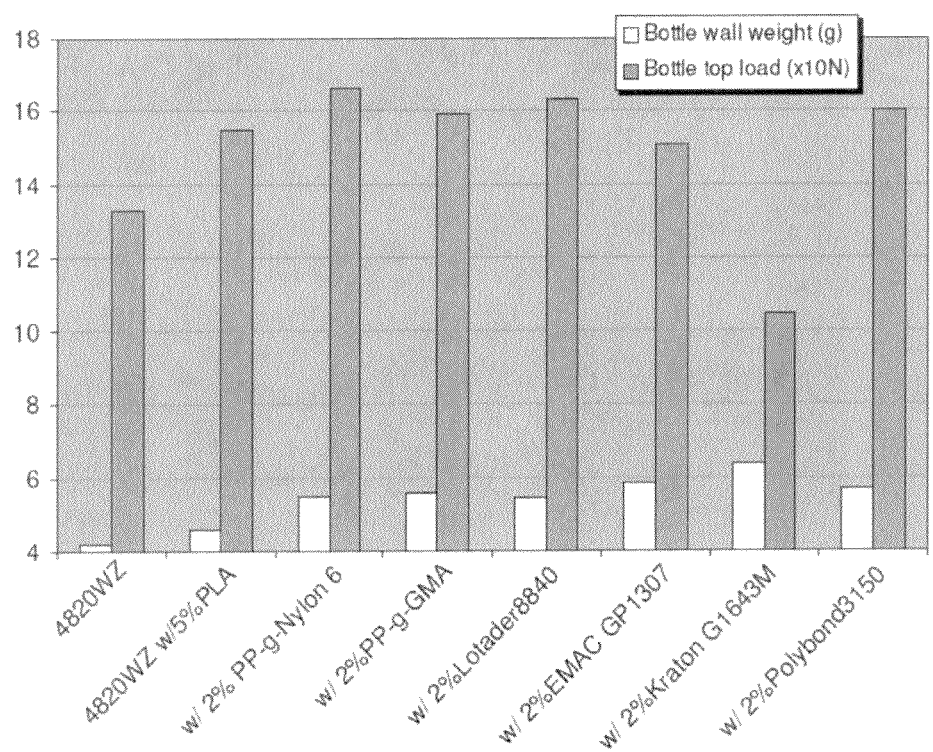
FIG. 3 illustrates the weight of side wall and maximum top load strength of ISBM bottles formed from various polymer samples in Example 2.

FIG. 3 is a plot of weight of the side wall and maximum top load strength for the samples. It was found that addition of 5% PLA could improve 4820WZ weight distribution in bottle middle wall by ~9% in relative to top and bottom, resulting in ~16% higher top load improvement. In general, compatibilized 4820WZ/PLA blends significantly outperformed the above non-compatibilized blend in improving bottle sidewall weight distribution (by 30~50%) and top load enhancement (>20%), except for the formulations containing commercial compatibilizers EMAC and SEBS. In general, higher weight of side wall is desired, as it means that weight distribution among bottle neck, side wall and bottom are more uniform, resulting in improved properties.

The produced ISBM bottles were also tested for cold temperature drop impact strength. Specifically, both 4820WZ and 4820WZ/PLA blend bottles were filled with water and aged at 40l for 24 hours. Then, the bottles were immediately tested for drop impact both vertically and horizontally at a height of 6 feet. No failure was obtained for all the bottles. The bodies of the bottles were also measured for densities. The densities range from 0.84~0.85, indicating that no potential cavitation was resulted from ISBM process, probably due to the extremely last blowing speed. Overall, addition of PLA into 4820WZ was able to increase the impact copolymer bottle opacity, significantly improve NM bottle top load without, sacrificing impact properties as shown in Table 2 below).

TABLE 2

| Samples | Height (feet) | Vertical drop | % Passed | Horizontal drop | % Passed |
|---|---|---|---|---|---|
| 5: 4820WZ | 6 | 5/5 | 100 | 5/5 | 100 |
| 6: w/5% PLA | 6 | 6/6 | 100 | 6/6 | 100 |
| 7: w/5% PLA/2% PP-g-Nylon6 | 6 | 3/3 | 100 | 3/3 | 100 |
| 8: w/5% PLA/2% PP-g-GMA | 6 | 5/5 | 100 | 5/5 | 100 |
| 9: w/5% PLA/2% Lotader 8840 | 6 | 4/4 | 100 | 4/4 | 100 |
| 10: w/5% PLA/2% Polybond3150 | 6 | 6/6 | 100 | 6/6 | 100 |
| 11: w/5% PLA/2% EMAC1307 | 6 | 5/5 | 100 | 5/5 | 100 |
| 12: w/5% PLA/2% Kraton 1643M | 6 | 4/4 | 100 | 4/4 | 100 |

While the foregoing is directed to embodiments of the present invention, other and further embodiments of the invention may be devised without departing from the basic scope thereof and the scope thereof is determined by the claims that follow.

What is claimed is:

1. A method of forming an injection stretch blow molded (ISBM) article containing a bio-based polymer comprising:
   providing a propylene-based polymer;
   contacting the propylene-based polymer with polylactic acid to form a polymeric blend, wherein the polymeric blend comprises at least 30 wt. % of the propylene-based polymer;
   injection molding the polymeric blend into a preform; and
   stretch-blowing the preform into an article, wherein the article exhibits a haze of at least about 40%.

2. The method of claim 1, wherein the article is stretch-blown at a production rate of at least about 1000 articles per hour.

3. The method of claim 1, wherein the article is stretch-blown at a production rate of at least about 3000 articles per hour.

4. The method of claim 1, wherein the propylene-based polymer exhibits a melt flow rate of from about 1 dg/min. to about 50 dg/min.

5. The method of claim 1, wherein the article is semi-opaque or opaque.

6. The method of claim 1, wherein the article is a dairy container.

7. The method of claim 1, wherein the contacting step includes contacting the propylene-based polymer with the polylactic acid in the presence of a modifier to form the polymeric blend.

8. The method of claim 7, wherein the modifier has a concentration in a range from about 2 wt. % to about 5 wt. % based on the weight of the polymeric blend.

9. The method of claim 7, wherein the modifier is selected from epoxy-functionalized polyolefins, PP-g-nylon, ethylene-methacrylate copolymer, and SEM.

10. The method of claim 1, wherein the propylene-based polymer is selected from propylene random copolymer and propylene impact copolymer.

11. The method of claim 1, wherein the propylene-based polymer is selected from propylene homopolymer, propylene random copolymer, and propylene impact copolymer.

12. The method of claim 1, wherein the propylene-based polymer has a concentration in a range from about 65 wt. % to about 95 wt. % based on the weight of the polymeric blend.

13. The method of claim 1, wherein the polylactic acid has a concentration in a range from about 5 wt. % to about 35 wt. % based on the weight of the polymeric blend.

14. The method of claim 1, wherein the contacting step includes contacting the propylene-based polymer with the polylactic acid in the presence of a reactive modifier or a non-reactive modifier to form the polymeric blend.

15. The method of claim 14, wherein the reactive modifier or the non-reactive modifier has a concentration in a range from about 1 wt. % to about 10 wt. % based on the weight of the polymeric blend.

16. The method of claim 14, wherein the reactive modifier or the non-reactive modifier are selected from epoxy-functionalized polyolefins, PP-g-nylon, ethylene-methacrylate copolymer, SEBS, maleated SEBS, and maleated polyolefins.

17. The method of claim 1, wherein the article exhibits a haze at least about 50%.

18. The method of claim 1, wherein the article exhibits a haze at least about 60%.

* * * * *